Patented Dec. 22, 1942

2,305,833

UNITED STATES PATENT OFFICE 2,305,833

HYDROLYSIS OF CELLULOSE

Carl Warth, Lowenberg, Silesia, Germany; vested in the Alien Property Custodian

No Drawing. Application June 20, 1939, Serial No. 280,151. In Germany June 20, 1938

9 Claims. (Cl. 127—37)

This invention relates to the hydrolysis of cellulose. It is known that cellulose-containing material may be converted into glucose by treating this raw material with super-concentrated hydrochloric acid. By "super-concentrated" hydrochloric acid is meant solutions of higher concentration than sp. gr. 1.16 ordinarily employed. In this connection the procedure is either to apply super-concentrated hydrochloric acid as such or to start with concentrated hydrochloric acid and introduce hydrochloric acid gas in the presence of the material to be hydrolysed.

If cellulose-containing material is treated with super-concentrated hydrochloric acid, a considerable quantity of heat is liberated. This rising of temperature results in secondary reactions which influence the production of the desired fermentable products. The substances formed as a result of these secondary reactions are sugar anhydrides and also polymerisation products, which may be dark coloured or black and can be hydrolysed only with difficulty or not at all.

The aforesaid drawbacks may be avoided if the hydrolysis of the cellulose is carried out in stages under momentarily changing conditions. It has been found that for any of the individual stages of the hydrolysis conditions may be set up which assure the best course of the hydrolysis process. By proper selection of the individual stages and the application of those conditions which are particularly favourable for these stages, it is possible to obtain a glucose or fermentable substance from cellulose, without the formation of by-products and non-hydrolysable substances.

The process according to the invention may be carried out in practice by moistening the cellulose-containing material with ordinary concentrated hydrochloric acid (sp. gr. 1.16) which has been cooled previously by a suitable method to a very low temperature, approximately 0° C. or less. During the moistening of the raw material with the concentrated hydrochloric acid care should be taken that the temperature of the mixture does not rise. The mixture is now placed in a container which permits the addition of gaseous hydrochloric acid to produce in this way a super-concentrated hydrochloric acid. During the introduction of hydrochloric acid gas, care should be taken that the temperature of the mass remains as low as possible. Under the action of the super-concentrated hydrochloric acid at the low temperature, the cellulose goes into solution as hydrocellulose. As soon as this operation has terminated the reaction is stopped, since a continuation of the hydrolysis in the presence of super-concentrated hydrochloric acid would lead to the formation of undesirable by-products in the second stage of the process.

The second stage of the hydrolysis proceeds best in the presence of the ordinary concentration (sp. gr. 1.16) so that acid present in the solution must be diluted. This may be effected by the introduction of water or water spray into the mixture. Another way is to reduce gradually the pressure in the system and to pump off the hydrochloric acid vapours. The latter may again be introduced at another part in the cycle of operations.

The mixture obtained consists in the residues of the treated raw material and a solution of the hydrocellulose in concentrated hydrochloric acid. The residues may now be separated from this solution by decantation or filtration or any other suitable procedure. Preferably the residues are washed with concentrated hydrochloric acid.

The hydrocellulose so obtained is left in its solvent, the hydrochloric acid, for the further hydrolysis. Preferably, in order to shorten substantially the hydrolysis, heat is applied. With a working temperature of, for example, approximately 70° C. the transformation of the hydrocellulose into glucose takes place very rapidly, and a light-coloured solution is obtained which results in a good yield of glucose or fermentable substances. With the new process it is now possible to proceed from the cellulose to the glucose in about an hour whilst the hitherto known methods required for this transformation a period of from 12 to 24 hours.

In carrying out the first stage of the process it is essential that the liberated heat should be rapidly dissipated. In similar cases this could be managed by passing the raw material into the so-called suspending medium to which organic solvents such as benzine or a mixture of carbon tetrachloride and benzine have been added. The same effect can be obtained by hydrochloric acid itself employed in the hydrolysis if such a quantity is used that the raw material is in suspension in the hydrochloric acid. Then besides the chemical action of the hydrochloric acid its physical heat-conducting capacity is also utilised.

The cooling-down of the raw material may be carried further by employing dry ice or carbon dioxide snow as the cooling medium. This cooling medium can be advantageously introduced directly into the substance.

If the cellulose-containing material is distributed in a suspending medium and gaseous hydrochloric acid is introduced for converting the cellulose into sugar, super-concentrated hydrochloric acid is produced.

If super-concentrated hydrochloric acid acts on cellulose-containing material, the cellulose dissolves as hydrocellulose. If the super-concentrated hydrochloric acid acts further on the hydrocellulose not only the desired glucose but also sugar anhydride is produced which tends to polymerise. In fact this anhydride and also polymerisation products therefrom considerably oppose the hydrolysis and cannot be reconverted into glucose or only with difficulty. Consequently a loss in the yield of the fermentable substances is brought about and since these non-fermentable substances have a dark colouration the entire product is transformed into a mass which is known under the name "black sugar."

The aforesaid difficulties can be avoided by the process according to the invention which will now be described in more detail.

It has been found that considerably better results can be obtained if the reaction is carried out in two stages. The first stage consists, as already indicated, in the action of the super-concentrated hydrochloric acid on the cellulose-containing material. This action is stopped as soon as the hydrocellulose is formed which usually occurs in a period of 15 minutes up to an hour. Obviously this time varies according to the raw material which is subjected to the treatment and it must be ascertained in each case. The second stage now commences. This preferably takes place by the separation from the liquid of the undissolved material, the residues, by decantation or filtration or any other suitable method. The liquid now consists of the suspending medium and of the solution of the hydrocellulose in the super-concentrated hydrochloric acid. This solution may be separated from the suspending medium simply by the formation of layers. If necessary the solution of the hydrocellulose can be extracted also by evaporation of the suspending medium at a temperature lying below the subsequent treatment temperature. For this purpose the distillation temperature of the suspending medium is chosen so that it is volatilised below the subsequent working temperature.

The solution of the hydrocellulose in the super-concentrated hydrochloric acid is now warmed in order to expel the excess gaseous hydrochloric acid. The gaseous hydrochloric acid, and if necessary also the suspending medium distilled over, may be recovered in suitable manner and may be returned to the cycle of operations. The remaining solution consists of a concentrated hydrochloric acid with the hydrocellulose absorbed and dissolved therein. In the heating carried out for distilling off excess hydrochloric acid and if necessary the suspending medium, the hydrocellulose is simultaneously reduced to glucose. Thus the formation of the sugar anhydride and of its polymerisation products, which is to be expected in the presence of super-concentrated hydrochloric acid, is practically completely prevented. A pure and only slightly coloured solution is obtained which, for example, may be added as a liquid to be fermented by corresponding dilution for the purpose of production of feeding yeast.

It is known that cellulose may be transformed into sugar by distributing the cellulose-containing material in a suspending medium which dissolves neither the cellulose nor the sugar and which is practically immiscible with water, and by introducing thereupon the gaseous hydrochloric acid into the suspension. Thus super-concentrated hydrochloric acid is obtained.

During the action of the super-concentrated hydrochloric acid on the cellulose-containing material the so-called "black sugar" is obtained as the final product, a product which in consequence of the secondary reaction occurring contains not only sugar but also highly polymerised substances which are black and give the final product its name. Hydrocellulose is primarily formed from the cellulose. On further treatment the glucose is formed therefrom in different stages of reduction. Besides sugar anhydrides are produced which tend to polymerise. Sugar anhydrides and also the polymeric products formed therefrom are in part no longer hydrolysable and therefore do not produce any fermentable sugar. The yield of sugar from the cellulose is in consequence substantially influenced by these undesired side reactions.

It has been found that the formation of sugar anhydride and of the polymerisation products produced therefrom may be wholly or substantially eliminated if the reaction is carried out in two stages. The first stage consists in subjecting the cellulose-containing material in the mentioned manner a short time to the treatment of the super-concentrated hydrochloric acid. The period during which the treatment takes place may amount to from 15 minutes up to one hour. It depends on the material from which it has departed and may fluctuate within certain limits. The hydrocellulose formed during the course of this first stage of reaction remains soluble or yet also in concentrated hydrochloric acid.

As soon as the hydrocellulose is formed the reaction of the first stage is therefore stopped, namely by annulling the super-concentration of the hydrochloric acid and by returning it to the concentrated hydrochloric acid. This may take place for example by introducing cold or warm water or vapour in a quantity corresponding to the production of concentrated hydrochloric acid into the reaction mixture consisting of suspending media, lignin and hydrocellulose.

The reaction mixture may, for example, be introduced into an expansion vessel in which water mist is blown in from nozzles. The quantity of the added water is so regulated that the water by absorbing of the excess gaseous hydrochloric acid forms ordinary concentrated hydrochloric acid. The method may be also carried out by introducing the reaction mixture into cold or warm water or by blowing or injecting it into a space filled with vapour.

The transference into the expansion vessel is particularly favourable because the hydrolysing action of the super-concentrated hydrochloric acid is very quickly eliminated and any further reaction which may be undesirable is stopped.

The non-dissolved residues are removed from the reaction mixture by decanting, filtration or other suitable manner. The suspending medium is removed through distillation whereby the boiling point of the suspending medium is preferably so selected that the temperature required for its removal is below the temperature at which the remaining solvent is afterwards converted to sugar. As soon as the super-concentrated hydrochloric acid is led back to the concentrated hydrochloric acid the reaction mixture is heated in order to accelerate further decomposition.

The subsequent reaction may also be obtained at normal temperatures. It has been found very advantageous to heat the reaction mixture up to approximately 70° C. because at this temperature the conversion of the hydrocellulose formed into sugar takes place very quickly.

In carrying out this method already after approximately 10 minutes a sugar formation is obtained which results in a very high yield of glucose.

The sugar solution obtained, contrary to the black sugar which previously was mentioned, is light-coloured and may, for example, be made by corresponding dilution and adjustment of the optimum pH value by means of neutralization with ammonia to a food solution extremely favourable for the purpose of producing feeding yeast whereby the ammonium chloride precipitated during the neutralization serves at the same time as an inorganic nitrogen source.

I claim:

1. A two-stage hydrolysis process for the conversion of cellulose to a sugar which comprises treating the cellulose with a hydrochloric acid solution having a concentration greater than a specific gravity of 1.16, maintaining the temperature not higher than about 0° C. until the conversion of the cellulose to a hydrocellulose solution and thereafter treating the hydrocellulose with a hydrochloric acid solution having a concentration less than a specific gravity of 1.16 at a temperature which is substantially above said first-mentioned temperature.

2. A two-stage hydrolysis process for the conversion of cellulose to a sugar, which comprises treating the cellulose with a hydrochloric acid solution having a concentration greater than a specific gravity of 1.16, maintaining the temperature not higher than about 0° C., until the conversion of the cellulose to a hydrocellulose solution and thereafter treating the hydrocellulose solution with a hydrochloric acid solution having a concentration less than a specific gravity of 1.16 at a temperature above normal room temperature but not exceeding about 70° C.

3. A process as described in claim 2 wherein a sufficient amount of superconcentrated hydrochloric acid solution is used in the first stage to dissipate the heat of reaction.

4. A process as described in claim 2 in which the temperature is kept from rising above 0° C. during the first stage by the addition of a solid anhydrous refrigerant directly to the hydrolysis mixture.

5. A two-stage hydrolysis process for the conversion of cellulose to a sugar which comprises treating the cellulose with a hydrochloric acid solution having a concentration greater than a specific gravity of 1.16, maintaining the temperature not higher than about 0° C., until the conversion of the cellulose to a hydrocellulose solution, diluting the hydrochloric acid solution to a concentration less than a specific gravity of 1.16 and further hydrolyzing the hydrocellulose with said diluted hydrochloric acid solution, at a temperature above normal room temperature but not exceeding about 70° C.

6. A process in accordance with claim 5 in which the hydrochloric acid solution is diluted by means of evaporation.

7. A two-stage hydrolysis process for the conversion of cellulose to a sugar which comprises treating the cellulose with a hydrochloric acid solution, introducing into said hydrochloric acid solution gaseous hydrochloric acid until the concentration of the hydrochloric acid is greater than a specific gravity of 1.16, maintaining the temperature not greater than about 0° C. until the conversion of the cellulose to a hydrocellulose solution, terminating the hydrolysis by diluting said hydrochloric acid solution to a concentration not greater than a specific gravity of 1.16 and continuing the hydrolysis of the hydrocellulose by means of the diluted hydrochloric acid solution.

8. A two-stage hydrolysis process for the conversion of cellulose to a sugar which comprises wetting the cellulose with a hydrochloric acid solution, introducing to said hydrochloric acid solution gaseous hydrochloric acid until the concentration is greater than the specific gravity of 1.16, maintaining the temperature at about 0° C. until the cellulose is converted to a hydrocellulose solution, separating the undissolved solids from the hydrocellulose, diluting the hydrochloric acid solution to a concentration not greater than a specific gravity of 1.16 and continuing the hydrolysis of the hydrocellulose with said diluted hydrochloric acid at a temperature of about 70° C.

9. A two-stage hydrolysis process for the conversion of cellulose to a sugar which comprises treating the cellulose with a hydrochloric acid solution having a concentration greater than a specific gravity of 1.16, maintaining the temperature not higher than about 0° C., until the conversion of the cellulose to a hydrocellulose solution, separating the undissolved solids from the hydrocellulose solution and further hydrolyzing the hydrocellulose with a hydrochloric acid solution having a concentration less than a specific gravity of 1.16, at a temperature above normal room temperature but not exceeding about 70° C.

CARL WARTH.